United States Patent [19]

Irie et al.

[11] Patent Number: 5,223,273
[45] Date of Patent: Jun. 29, 1993

[54] BLADDER CONTROL MECHANISM OF TIRE VULCANIZER

[75] Inventors: Nobuhiko Irie; Toshifumi Murakami, both of Nagasaki, Japan

[73] Assignee: Mitsubishi Jukogyo Kabushiki Kaisha, Tokyo, Japan

[21] Appl. No.: 804,032

[22] Filed: Dec. 9, 1991

[30] Foreign Application Priority Data

Dec. 13, 1990 [JP] Japan ............... 2-400531[U]

[51] Int. Cl.⁵ .............................. B29D 29/00
[52] U.S. Cl. .................... 425/29; 425/48; 425/52
[58] Field of Search ............ 425/27, 29, 35, 43, 425/48, 52

[56] References Cited

U.S. PATENT DOCUMENTS 2,728,105 12/1955 Pacciarini .............. 425/43
3,690,795 9/1972 Yoshida et al. .......... 425/29
3,846,058 11/1974 Yoshida et al. .......... 425/48 X
4,670,209 6/1987 Nakagawa et al. ........ 425/52 X

*Primary Examiner*—Charles Hart
*Attorney, Agent, or Firm*—Wenderoth, Lind & Ponack

[57] ABSTRACT

A bladder control mechanism of a tire vulcanizer includes an actuating mechanism for moving a bladder holder and a bladder gripping bowl of an upper bladder clamp relative to one another. A spring of the control mechanism imparts a gripping force to the bladder holder. Therefore, no re-tightening is required while a bladder is in use. When the bladder is to be changed, the actuating mechanism is actuated to forcibly separate the bladder holder from the bladder gripping bowl in opposition to the spring. As a result, the bladder holder frees the edge portion of the bladder. Further, due to a bayonet connection, the bladder can be readily changed in a short time by turning and removing the bladder holder.

8 Claims, 6 Drawing Sheets

BLADDER CONTROL MECHANISM OF TIRE VULCANIZER

BACKGROUND OF THE INVENTION

1. Field of the Invention

This invention relates to a bladder control mechanism of a tire vulcanizer.

2. Description of the Prior Art

A conventional tire vulcanizer of the type using a bladder will be described with reference to FIGS. 7 and 8. In these drawings, T designates a tire under vulcanization, M a metal mold comprising an upper mold half Ma and a lower mold half Mb, and Pa and Pb upper and lower platens for heating the metal mold M from the upper and lower sides. Reference numeral 1 designates a body frame, 2 a bladder control mechanism, 3 an upper central mechanism including a known chuck mechanism, and 4 a pressure cylinder.

The bladder control mechanism 2 comprises a bladder receiving barrel 11 suspended from the lower platen Pb, a lower ring 12 slidable along the inner surface of the bladder receiving barrel 11, an upper ring 13 slidable along the inner surface of the lower ring 12, a center post 14 air-tightly slidable inside a central section of the upper ring 12, a center-post lifting cylinder 17 secured to a bottom plate of the bladder receiving barrel 11 and whose piston rod 17a is secured at its end to the lower end of the center post 14, a sleeve 16 secured to the lower face of the lower ring 12, a bladder clamping cylinder 18 secured to the lower end of the sleeve 16 and whose piston rod 18a is secured at its end to the lower end of the center-post lifting cylinder 17, a bladder gripping bowl 21 secured to the upper end of the center post 14 via a split ring 19 and a split-ring holder 20, and a bladder holder 22 detachably attached to the bladder gripping bowl 21 by a bolt 23.

The upper ring 13 is provided with nozzles 13a and 13b through which a heating medium of high temperature and high pressure is injected into and ejected from a bladder B. The upper edge of the lower ring 12 and of the upper ring 13 define a recess in which a lower edge portion of the bladder B is received and gripped. When the upper ring 13 is moved upwards relative to the lower ring 12 by operating the bladder clamping cylinder 18, the lower edge portion of the bladder B is released from the gripped state; on the other hand, when it is moved downwards, the lower edge portion is gripped.

The conventional tire vulcanizer of the type using a bladder as shown in FIGS. 7 and 8 has the following problems.

(1) During tire vulcanization, the bladder B expands; as a result, an internal force acts on the gripped portion such that the bladder B elongates radially, and due to creep, there is a tendency for the thickness to decrease as time elapses. Therefore, since an upper edge portion of the bladder B is gripped by bolting, it is necessary to stop the machine periodically to perform re-bolting or re-tightening. Especially after a new bladder B has been substituted, re-tightening must be performed frequently.

(2) The bladder B must be replaced not only when the tire size is changed but also when three or four days have passed even where the tire size is unchanged. However, it is not easy to detach the bladder holder 22 because the temperature therearound is as high as 100° C., and there is a bonded portion where a sealing compound has been applied in order to solve the problem (1) above. Thus, the exchanging of bladders must be made manually under bad conditions which imposes severe work on workers and demands a large amount of time.

(3) The two problems above have been solved substantially in relation to the lower edge portion of the bladder B. However, they have not yet been solved in relation to the upper edge portion because of limitations relating to space, temperature, etc.

SUMMARY OF THE INVENTION

It is an object of the present invention to provide a bladder control mechanism of a tire vulcanizer which exerts a stable gripping force so that no re-tightening is required while a bladder is in use and which facilitates the removal of a bladder holder when the bladder is to be changed.

To accomplish the foregoing object, the present invention provides a bladder control mechanism of a tire vulcanizer which includes an actuating mechanism for moving a bladder holder and a bladder gripping bowl of an upper bladder clamp relative to one another.

The actuating mechanism may include a spring for imparting a gripping force to the bladder holder of the upper bladder clamp. Gripping/releasing means may be provided for gripping and releasing the bladder holder whereby the bladder holder is detachably secured to the remainder of the bladder control mechanism.

Specifically, the bladder holder of the upper bladder clamp may be made detachable by a bayonet connection.

As will be appreciated, he bladder control mechanism according to the present invention includes the actuating mechanism for moving the bladder holder and the bladder gripping bowl of the upper bladder clamp relative to one another, and which actuating mechanism may include the spring (spring constant of which is appropriately selected) for imparting a gripping force to the bladder holder. Therefore, no re-tightening is required while the bladder is in use.

When the bladder is to be changed, the actuating means forcibly separates the bladder holder from the bladder gripping bowl in opposition to the spring force. As a result, the bladder holder frees an edge portion of the bladder. Further, because the bladder holder itself forms part of the bayonet connection, the bladder can readily be changed in a short time by simply turning and removing the bladder holder.

After a new bladder is mounted, the bladder holder is fitted in and turned in the reverse direction, and the actuating mechanism is actuated so that the spring becomes active to urge the bladder holder toward the bladder gripping bowl.

DETAILED DESCRIPTION OF THE PREFERRED EMBODIMENTS

Figure 1:
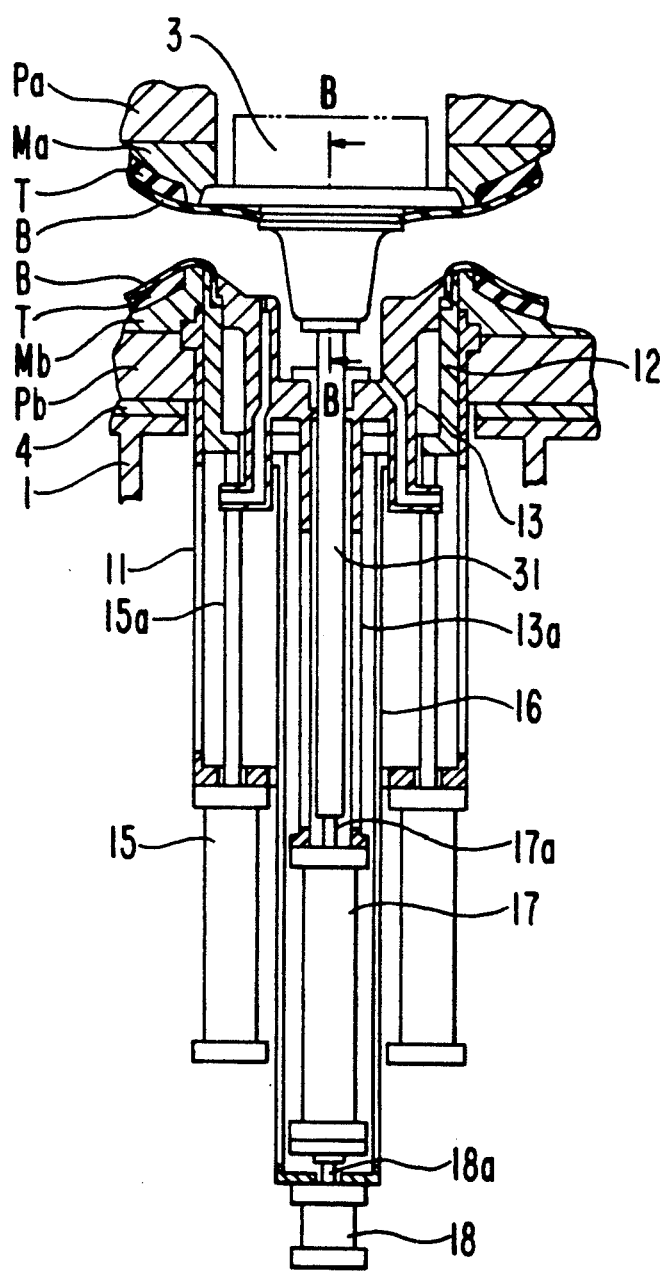
FIG. 1 is a front view, partially in section, of a first embodiment of a bladder control mechanism of a tire vulcanizer according to the present invention.
Figure 2:
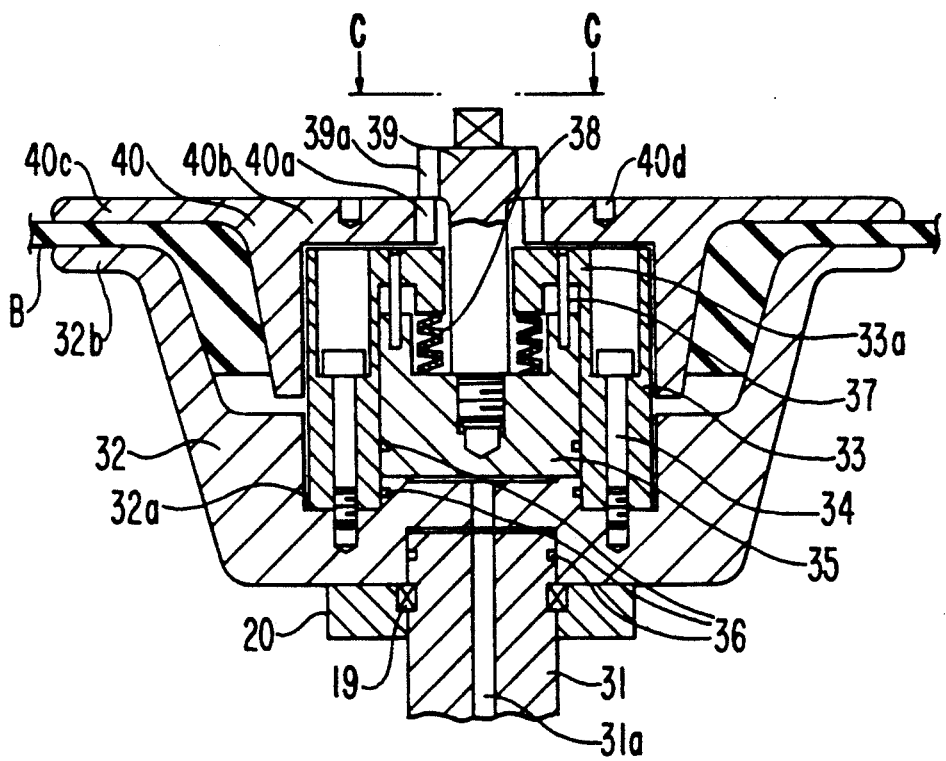
FIG. 2 is a vertical sectional view taken in the direction of the arrows B in FIG. 1.
Figure 3:
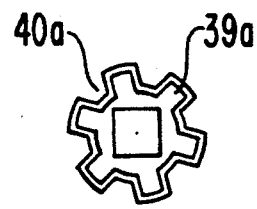
FIG. 3 is a plan view taken in the direction of the arrows C in FIG. 2.

A first embodiment of a bladder control mechanism of a tire vulcanizer according to the present invention will be described with reference to FIGS. 1 through 3. In these drawings, reference numeral 31 designates a center post which is identical with the conventional center post 14 except that a fluid passage 31a is provided inside the center post 31.

A bladder gripping bowl 32 (corresponding to the conventional bladder gripping bowl 21) is secured to the upper end of the center post 31 via a split ring 19 and a split-ring holder 20. A means for gripping and releasing an upper edge portion of a bladder B comprises a cylinder 33 whose lower portion is received in an inner recess 32a of the bladder gripping bowl 22 and secured thereto by bolts 34, a piston 35 slidably disposed inside the cylinder 33, a fluid sealing member 36 of the known type, a plurality of pins 37 having first ends press-fitted in and secured to the piston 35 and second ends slidably inserted in corresponding holes 33a of the cylinder 33, and a compression spring 38 interposed between the cylinder 33 and the piston 35 for pushing down the piston and exerting a gripping force.

A bladder holder 40 has a radial flange portion 40c which grips the upper edge portion of the bladder B in conjunction with an upper flange portion 32b of the bladder gripping bowl 32.

An inner flange portion 40b of the bladder holder 40 is formed with spanner holes 40d and teeth 40a which form a bridged lock, and the head of a bolt 39 secured to the piston 35 is formed with teeth 39a which come into engagement with the teeth 40a of the bladder holder 40 to attain a bayonet connection.

In the foregoing bladder control mechanism according to the present invention, when fluid is supplied through the fluid passage 31a into the cylinder 33, the piston 35 moves up in opposition to the spring force of the spring 38, and the teeth 39a separate from the teeth 40a. When additional fluid is supplied into the cylinder 32, the end of each pin 37 comes into contact with the lower face of the inner flange portion 40b of the bladder holder 40 to forcibly push up the bladder holder 40, so that the upper edge portion of the bladder B is released. Then, by making use of the spanner holes 40d, the bladder holder 40 is turned to disengage the teeth 39a from the teeth 40a (see FIG. 3). Consequently, the bladder holder 40 becomes removable, that is, the bladder holder 40 and the bladder B can be removed in that order.

When a different bladder B is to be mounted, a procedure reverse to that described above is performed, and the fluid is discharged from the cylinder 33. That is, the fluid inside the cylinder 33 is ejected through the passage 31a by the spring force of the spring 38, and the upper edge portion of the bladder B is gripped under the force imparted by the spring 38.

Figure 4:
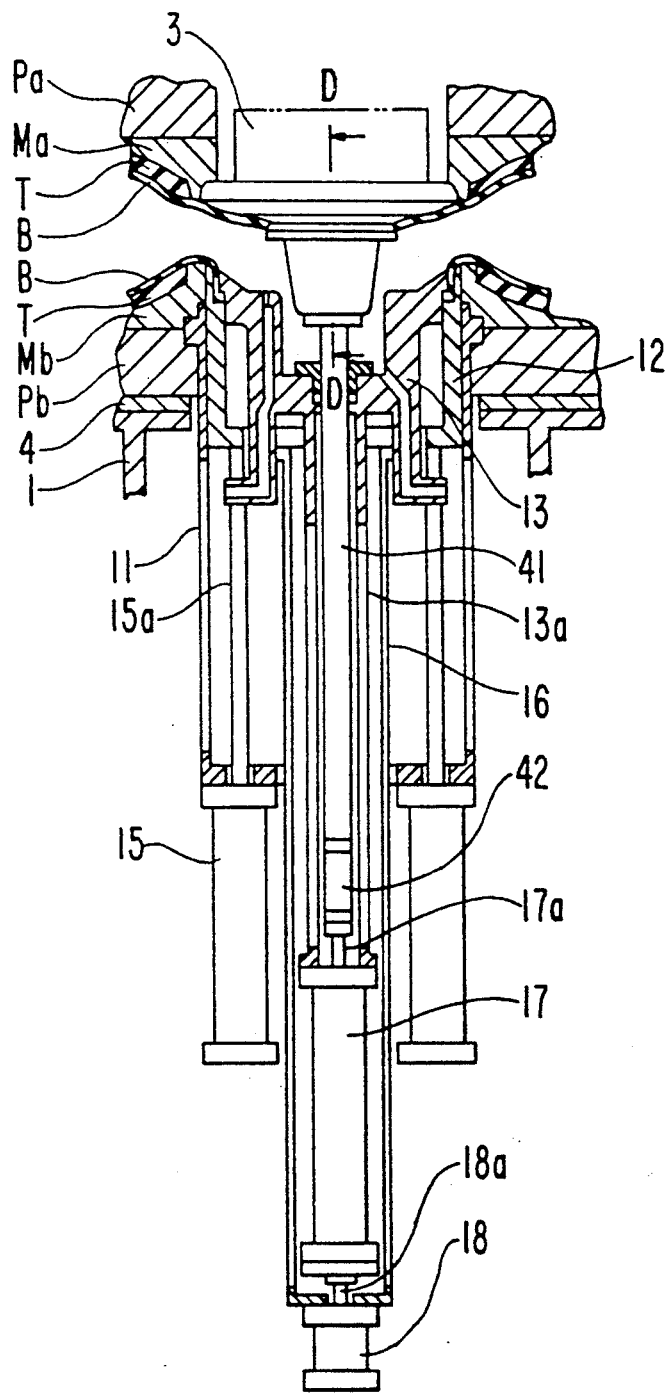
FIG. 4 is a front view, partially in section, of a second embodiment of the bladder control mechanism according to the present invention.
Figure 5:
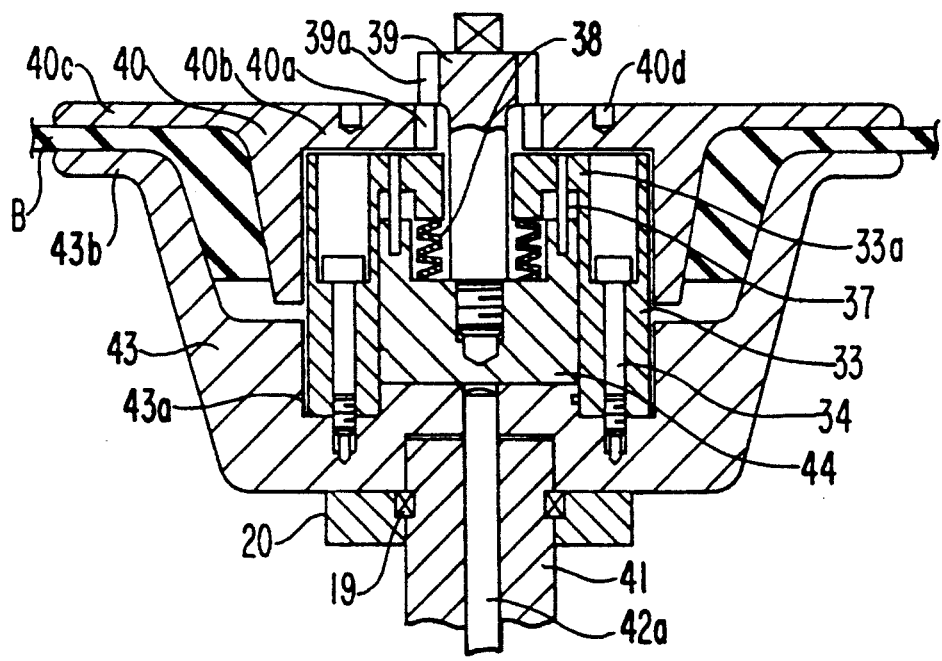
FIG. 5 is a vertical sectional view taken in the direction of the arrows D in FIG. 4.

A second embodiment of the bladder control mechanism according to the present invention will be described with reference to FIGS. 4 and 5. In these drawings, a center post 41 (corresponding to the center post 31) is secured to the end of a piston rod 17a of a center-post lifting cylinder 17 via a fluid cylinder 42, a bladder gripping bowl 43 is secured to the upper end of the center post 41 via a split ring 19 and a split-ring holder 20, a cylinder 33 is received in an inner recess 43a of the bladder gripping bowl 43 and is secured thereto by bolts 34, and a piston 44 is slidably disposed inside the cylinder 33. An upper edge portion of the bladder B is gripped between an upper flange portion 43b of the bladder gripping bowl 43 and a radial flange portion of a bladder holder 40. In this embodiment, instead of directly introducing fluid into the cylinder as in the first embodiment, the upper edge portion of the bladder B is gripped and released by means of a piston rod 42a of the fluid cylinder 42, this piston rod being slidably guided by and supported in through-holes formed in the bladder gripping bowl 43 and the center post 41.

Figure 6:
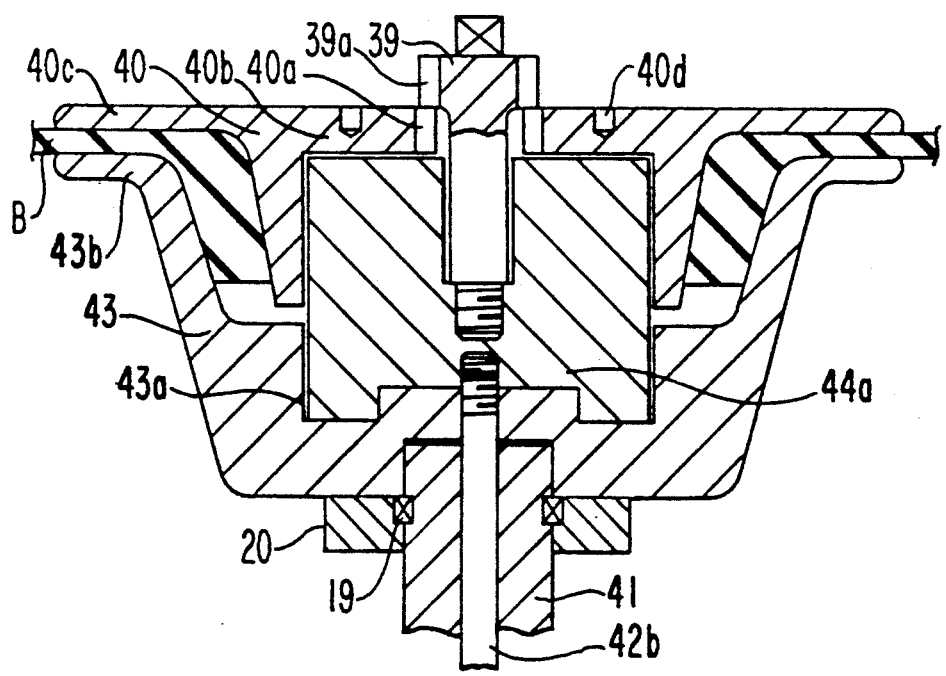
FIG. 6 is a vertical sectional view of a portion of a third embodiment of the bladder control mechanism according to the present invention.
Figure 7:
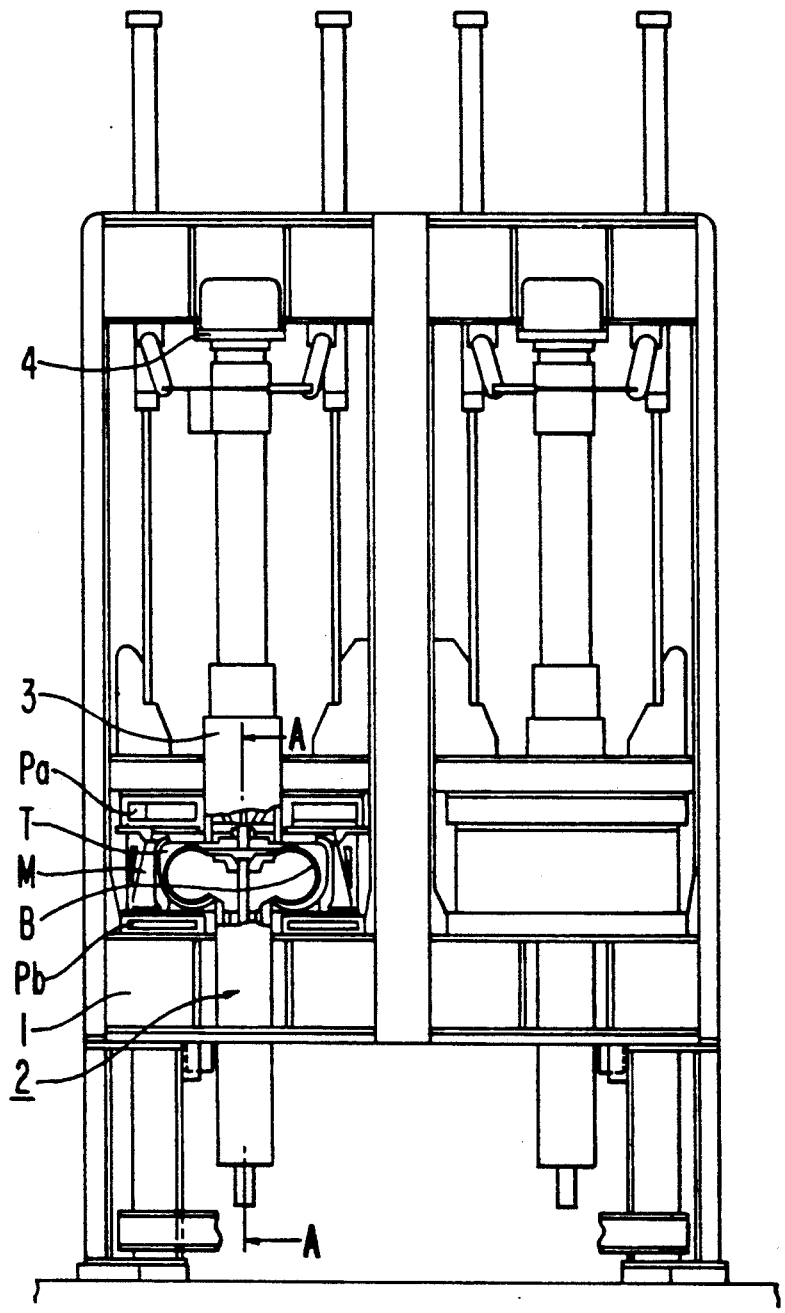
FIG. 7 is a front view, partially broken-away, of a conventional tire vulcanizer.
Figure 8:
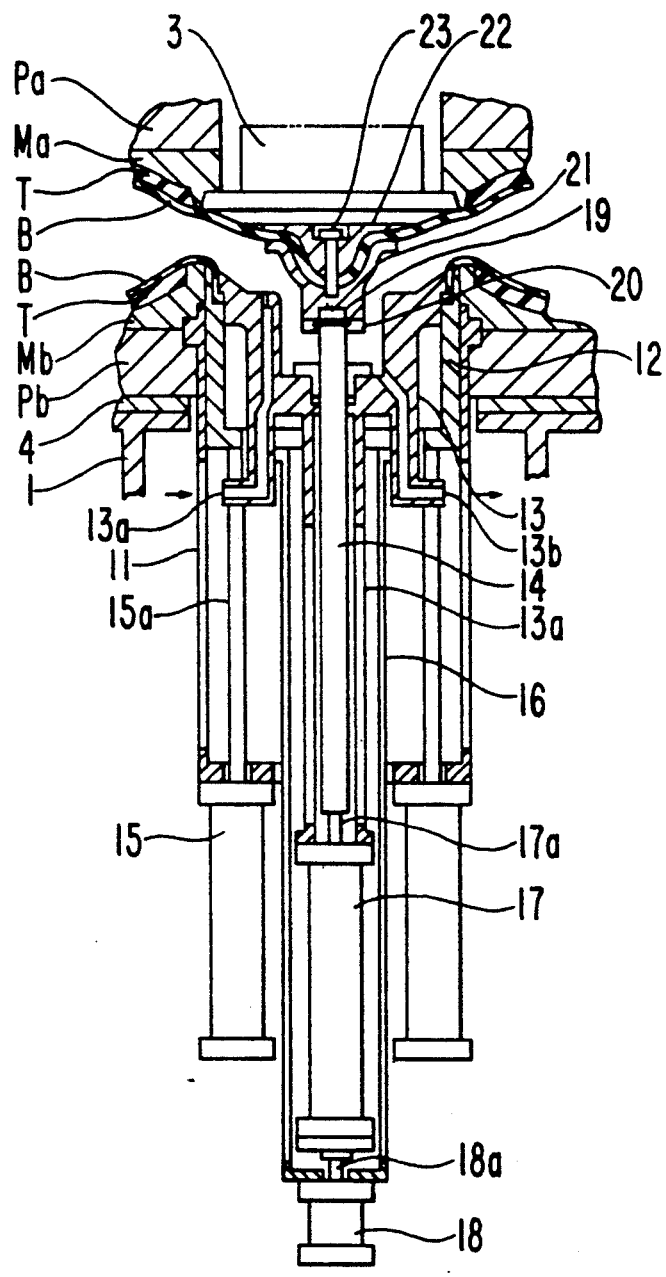
FIG. 8 is a vertical sectional view taken in the direction of the arrows A in FIG. 7.

FIG. 6 shows a third embodiment. Although the foregoing embodiments use a safety mechanism in which the bladder B is always gripped under a force exerted by the spring, the third embodiment of FIG. 6 uses the cylinder 42 of FIG. 4 by which the bladder holder 40 is held relative to the bladder gripping bowl 43.

During vulcanization with the metal mold closed, the bladder gripping bowl 43, the bladder B and the bladder holder 40 are pressed against the mold by the internal pressure of the bladder. Because the internal pressure is in a self-sealed state, the force of the cylinder 42 becomes unnecessary. That is, the bladder B may be sufficiently gripped by means of the cylinder 42 while the mold is open or in a so-called preshaping state. Since the preshaping pressure is generally on the order of 1 to 2 kg/mm$^2$ and is very small as compared to a vulcanization pressure, this causes no problem from a practical point of view. The cylinder 42 may be replaced by a screw or a like linear actuator to move the piston 43.

As described above, the bladder control mechanism of the present invention includes an actuation means for moving the bladder holder and the bladder gripping bowl of the upper bladder clamp relative to one another, and which means may include a spring (spring constant of which is appropriately selected) which imparts a gripping force to the bladder holder of the upper bladder clamp. Therefore, no re-tightening is required while the bladder is in use.

When the bladder is to be changed, the actuating means forcibly separates the bladder holder from the bladder gripping bowl in opposition to the spring force. As a result, the bladder holder frees the edge portion of the bladder. Further the bladder can readily be changed in a short time by turning and removing the bladder holder owing to the bayonet connection.

What is claimed is:

1. In a tire vulcanizing machine, a bladder control mechanism comprising: an upper bladder clamp including a bladder gripping bowl having an upper portion, and a bladder holder having a radial portion facing toward the upper portion of said bladder gripping bowl, the upper portion of said bladder gripping bowl and the radial portion of said bladder holder clamping an upper edge of the bladder therebetween; and actuating means for moving said bladder gripping bowl and said bladder holder relative to one another in directions in which said upper portion of the bladder gripping bowl and said radial portion of the bladder holder are moved toward and away from one another.

2. The bladder control mechanism in a tire vulcanizing machine as claimed in claim 1, wherein said actuating means includes a spring operatively connected to said bladder holder in a manner in which the spring exerts a biasing force on said bladder holder which urges said radial portion thereof toward the upper portion of said bladder gripping bowl, and further comprising gripping/releasing means for detachably securing said bladder holder to the remainder of the bladder control mechanism.

3. The bladder control mechanism in a tire vulcanizing machine as claimed in claim 2, wherein said gripping/releasing means is a bayonet connection.

4. The bladder control mechanism in a tire vulcanizing machine as claimed in claim 1, wherein said bladder holder is detachably secured to the remainder of the bladder control mechanism via a bayonet connection.

5. The bladder control mechanism in a tire vulcanizing machine as claimed in claim 1, wherein said actuating means comprises a piston slidably received within said bladder gripping bowl.

6. The bladder control mechanism in a tire vulcanizing machine as claimed in claim 5, wherein said actuating means further comprises a linear actuator fixed to said piston.

7. The bladder control mechanism in a tire vulcanizing machine as claimed in claim 5, and further comprising a bolt fixed to said piston and extending axially through said bladder holder at a central portion of said bladder holder, and wherein said bladder holder has teeth at the central portion thereof, and said bolt has teeth engaged with the teeth of said bladder holder, said teeth of the bladder holder and the teeth of said bolt constituting a bayonet connection by which said bladder holder is detachably secured to the remainder of the bladder control mechanism.

8. The bladder control mechanism in a tire vulcanizing machine as claimed in claim 6, and further comprising a bolt fixed to said piston and extending axially through said bladder holder at a central portion of said bladder holder, and wherein said bladder holder has teeth at the central portion thereof, and said bolt has teeth engaged with the teeth of said bladder holder, said teeth of the bladder holder and the teeth of said bolt constituting as bayonet connection by which said bladder holder is detachably secured to the remainder of the bladder control mechanism.

* * * * *